March 17, 1931. W. R. COLLINGS 1,796,920
METHOD OF TREATING BRINE
Filed Sept. 12, 1928
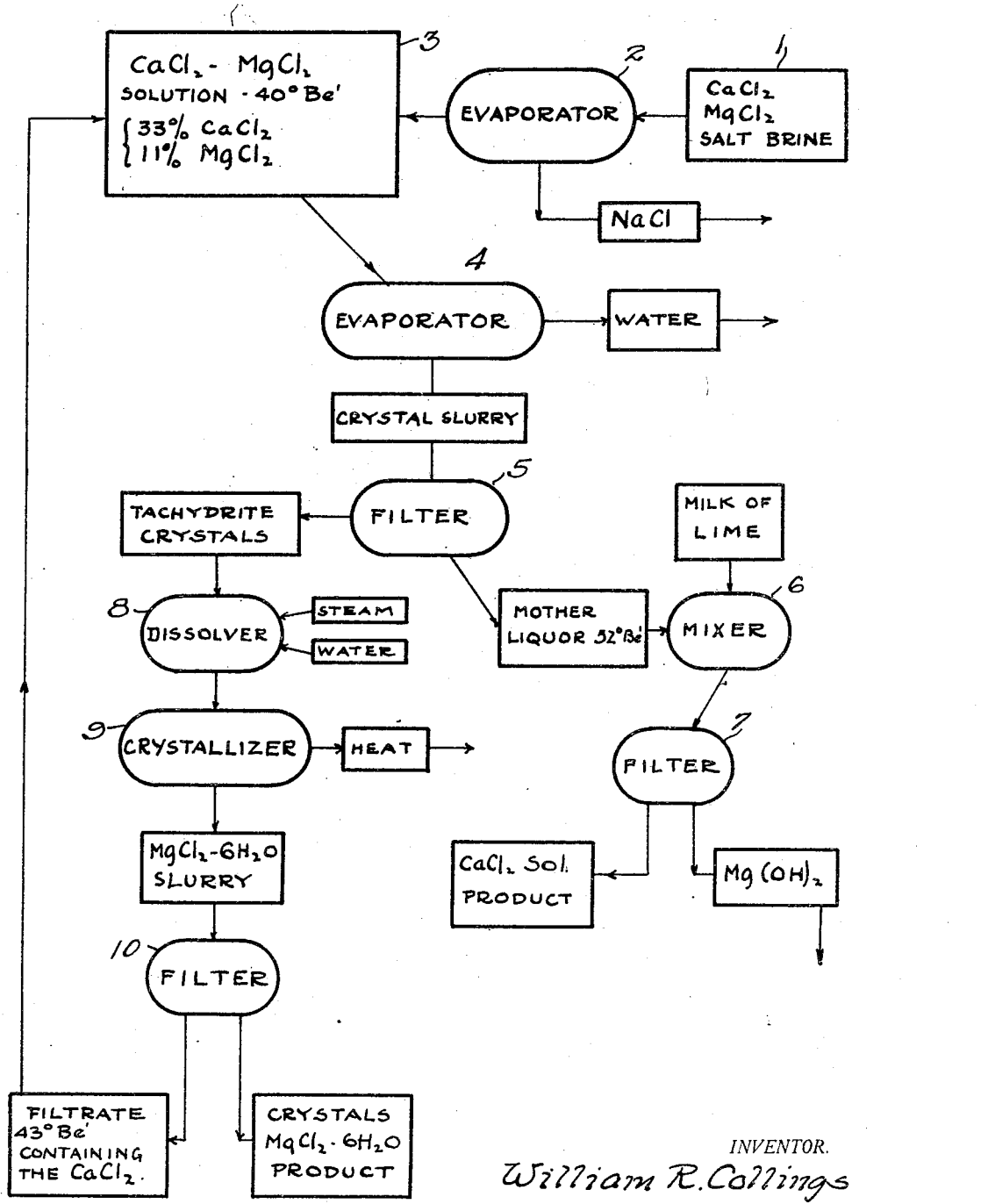
INVENTOR.
William R. Collings
BY
Fay, Oberlin & Fay
ATTORNEYS.

Patented Mar. 17, 1931

1,796,920

UNITED STATES PATENT OFFICE

WILLIAM R. COLLINGS, OF MIDLAND, MICHIGAN, ASSIGNOR TO THE DOW CHEMICAL COMPANY, OF MIDLAND, MICHIGAN, A CORPORATION OF MICHIGAN

METHOD OF TREATING BRINE

Application filed September 12, 1928. Serial No. 305,493.

In United States Letters Patent No. 1,627,068 to A. K. Smith and C. F. Prutton, dated May 3, 1927, there is disclosed an improved method or process for treating brines which contain calcium and magnesium chlorides, with the object of separating the latter from the former. Incidentally to such process the calcium and magnesium chlorides, at least in part, are crystallized out of the solution in the form of a double salt known as tachydrite ($CaCl_2.2MgCl_2.12H_2O$). These crystals are then separated from the mother liquor and by appropriate treatment the calcium chloride content thereof may be separated from the magnesium chloride and the latter purified.

One object of the present improved method of treating brine is to provide for more effective regulation of the steps leading up to the formation and separation of such tachydrite in the above described process. A further object is to facilitate the separation of the calcium chloride and magnesium chloride that compose such tachydrite.

To the accomplishment of the foregoing and related ends, the invention, then, consists of the steps hereinafter fully described and particularly pointed out in the claims, the annexed drawing and the following description illustrating and setting forth in detail certain steps embodying the invention, such disclosed means constituting, however, but several of the ways in which the principle of the invention may be used.

In said annexed drawing:—

The single figure there appearing is a diagrammatic representation on the order of a flow sheet illustrating the apparatus and steps employed in carrying out the present improved process.

In the case of brine from the Midland, Michigan, field which contains, in addition to the hereinbefore mentioned constituents, traces of iron, bromine, etc., the brine will be preliminarily treated to separate such minor constituents. The brine is then received in a storage and settling tank 1 from which it is taken for the purpose of concentration to an evaporator 2 where the salt (NaCl) is eliminated, producing a 40° Bé. solution, containing approximately 33 per cent. calcium chloride ($CaCl_2$) and 11 per cent. magnesium chloride ($MgCl_2$), which is stored in one or more tanks 3. Such solution is then further evaporated under vacuum in a second evaporator 4 with the formation of tachydrite crystals, substantially as described in the aforesaid Patent No. 1,627,068. These crystals, having a composition expressed by the formula $CaCl_2.2MgCl_2.12H_2O$ as aforesaid, are thereupon separated from the mother liquor in a filter 5. The mother liquor of approximately 52°-52.5° Bé. gravity, contains a largely increased proportion of calcium chloride to magnesium chloride over the original solution, its composition being roughly 53 per cent $CaCl_2$ and 5 per cent $MgCl_2$. Such mother liquor is then treated with milk of lime in a mixing tank 6, whereby the magnesium chloride content thereof is precipitated as magnesium hydrate. Such hydrate is separated in filter 7 and removed from the process, while the filtrate, which consists of a substantially pure solution of calcium chloride of approximately 50° Bé. constitutes the calcium chloride product of the process and may be conducted to the calcium chloride finishing plant, not forming a part of the present system.

The tachydrite crystals from filter 5 are washed to purify them from adherent mother liquor and dissolved either in situ or after being transferred to a dissolving tank 8, in a limited amount of water with heating to a temperature of 90° to 100° C. Preferably this step is accomplished by direct introduction of steam into the mixture, which may be stirred to facilitate solution, and then sufficient water is added to adjust the strength of the resulting solution, so that, when cooled to approximately 30° C., the gravity of the filtrate after separating the crystals found in such cooling is from 42.5° to 43° Bé. Experience has shown that when the solution is so adjusted, all of the calcium chloride remains dissolved at 30° C., while a portion of the magnesium chloride content will separate out as pure crystals of the hexahydrate salt ($MgCl_2.6H_2O$). At this stage the solution contains approximately 27% MgCl₂ and 16% CaCl₂, before crystallization occurs.

The hot solution from 8 is drawn off to a crystallizer 9, wherein it is cooled to approximately 30° C., whereupon crystals of magnesium chloride hexahydrate (MgCl₂.6H₂O) are precipitated, while all of the calcium chloride remains in the solution. The crystals are separated from the solution in filter 10, washed free from adherent residual liquor, and, thus purified, constitutes the magnesium chloride product of the present process. If desired, these crystals may be further processed to reduce their water content. In such case they may be melted to produce a hot concentrated magnesium chloride solution which is evaporated down in a suitable finishing kettle. The filtrate from 10 containing approximately 24 per cent. CaCl₂ and 20 per cent. MgCl₂ with gravity of 43° Bé. is returned to tank 3.

Other modes of applying the principle of my invention may be employed instead of the one explained, change being made as regards the method herein disclosed, provided the step or steps stated by any of the following claims or the equivalent of such stated step or steps be employed.

I therefore particularly point out and distinctly claim as my invention:—

1. In a method of treating a brine of the character described, the steps which consist in evaporating such brine to crystallize out the sodium chloride; evaporating the residual brine containing calcium and magnesium chlorides to crystallize out the latter in the form of tachydrite and leave a mother liquor having a higher proportion of calcium chloride to magnesium chloride than the original brine; filtering out the tachydrite crystals; dissolving same in a limited amount of water; crystallizing magnesium chloride hexahydrate from the resulting solution; separating such magnesium chloride crystals and returning the residual solution to the second step.

2. In a method of treating a brine of the character described, the steps which consist in evaporating such brine to crystallize out the sodium chloride; evaporating the residual brine containing calcium and magnesium chlorides to crystallize out the latter in the form of tachydrite and leave a mother liquor having a higher proportion of calcium chloride to magnesium chloride than the original brine; separating such tachydrite and dissolving the same in a limited amount of water with addition of heat, whereby a solution is produced such that when cooled to approximately 30° C. the filtrate remaining from the crystals thereupon formed will have a gravity of between 42.5° and 43.0° Bé.

3. In a method of treating a brine of the character described, the steps which consist in evaporating such brine to crystallize out the sodium chloride; evaporating the residual brine containing calcium and magnesium chlorides to crystallize out the latter in the form of tachydrite and leave a mother liquor having a higher proportion of calcium chloride to magnesium chloride than the original brine; separating such tachydrite and dissolving the same in a limited amount of water with addition of heat, whereby a solution is produced such that when cooled to approximately 30° C. the filtrate remaining from the crystals thereupon formed will have a gravity of between 42.5° and 43.0° Bé., then cooling such solution to crystallize out magnesium chloride hexahydrate and separating the latter from the residual solution.

4. In a method of treating a brine of the character described, the steps which consist in evaporating such brine to crystallize out the sodium chloride; evaporating the residual brine containing calcium and magnesium chlorides to crystallize out the latter in the form of tachydrite and leave a mother liquor having a higher proportion of calcium chloride to magnesium chloride than the original brine; separating such tachydrite and dissolving the same in a limited amount of water with addition of heat, whereby a solution is produced such that when cooled to approximately 30° C. the filtrate remaining from the crystals thereupon formed will have a gravity of between 42.5° and 43.0° Bé.; then cooling such solution to crystallize out magnesium chloride hexahydrate; separating the latter from the residual solution and returning such solution to the second step.

5. In a method of treating a brine of the character described, the steps which consist in evaporating such brine to crystallize out the sodium chloride; evaporating the residual brine containing calcium and magnesium chlorides to crystallize out the latter in the form of tachydrite and leave a mother liquor having a higher proportion of calcium chloride to magnesium chloride than the original brine; separating such tachydrite; treating the mother liquor to separate the magnesium chloride content remaining therein; dissolving the tachydrite crystals in a limited amount of water with addition of heat, whereby a solution is produced such that when cooled to approximately 30° C. the filtrate remaining from the crystals thereupon formed will have a gravity of between 42.5° and 43.0° Bé.; then cooling such solution to crystallize out magnesium chloride hexahydrate; separating the latter from the residual solution and returning such solution to the second step.

6. In a method of separating calcium chloride from magnesium chloride in solution together, the steps which consist in evaporating such solution to crystallize out such chlorides in the form of tachydrite and leave a mother liquor having a higher proportion of calcium chloride to magnesium chloride than the original solution; separating such tachydrite and dissolving the same in a limited amount of water, whereby a solution is produced from which magnesium chloride hexahydrate ($MgCl_2.6H_2O$) will crystallize out and leave calcium chloride dissolved therein.

7. In a method of separating calcium chloride from magnesium chloride in solution together, the steps which consist in evaporating such solution to crystallize out such chlorides in the form of tachydrite and leave a mother liquor having a higher proportion of calcium chloride to magnesium chloride than the original solution; separating such tachydrite and dissolving the same in a limited amount of water, whereby a solution is produced from which magnesium chloride hexahydrate ($MgCl_2.6H_2O$) will crystallize out and leave calcium chloride dissolved therein crystallizing out such hexahydrate and returning the residual solution to the original mixture.

8. In a method of separating calcium chloride from magnesium chloride in solution together, the steps which consist in evaporating such solution to crystallize out such chlorides in the form of tachydrite and leave a mother liquor having a higher proportion of calcium chloride to magnesium chloride than the original solution; separating such tachydrite and dissolving same in a limited amount of water with addition of heat, whereby a solution is produced such that when cooled to approximately 30° C. the filtrate remaining from the crystals thereupon formed will have a gravity of between 42.5° and 43.0° Bé.; then cooling such solution to crystallize out magnesium chloride hexahydrate and separating the latter from the residual solution.

9. In a method of separating calcium chloride from magnesium chloride in solution together, the steps which consist in evaporating such solution to crystallize out such chlorides in the form of tachydrite and leave a mother liquor having a higher proportion of calcium chloride to magnesium chloride than the original solution; separating such tachydrite and dissolving same in a limited amount of water with addition of heat whereby a solution is produced such that when cooled to approximately 30° C. the filtrate remaining from the crystals thereupon formed will have a gravity of between 42.5° to 43.0° Bé.; then cooling such solution to crystallize out magnesium chloride hexahydrate; separating such hexahydrate crystals from the residual solution and returning the latter to the original solution.

10. In a method of separating calcium chloride from magnesium chloride in solution together, the steps which consist in evaporating such solution to crystallize out such chlorides in the form of tachydrite and leave a mother liquor having a higher proportion of calcium chloride to magnesium chloride than the original solution; separating such tachydrite; treating the mother liquor to separate the magnesium chloride content remaining therein and dissolving such tachydrite in a limited amount of water, whereby a solution is produced from which magnesium chloride hexahydrate ($MgCl_2.6H_2O$) will crystallize out and leave calcium chloride dissolved therein.

11. In a method of separating calcium chloride from magnesium chloride in solution together, the steps which consist in evaporating such solution to crystallize out such chlorides in the form of tachydrite and leave a mother liquor having a higher proportion of calcium chloride to magnesium chloride than the original solution; separating such tachydrite; treating the mother liquor to separate the magnesium chloride content remaining therein; dissolving such tachydrite in a limited amount of water with addition of heat, whereby a solution is produced such that when cooled to approximately 30° C. the filtrate remaining from the crystals thereupon formed will have a gravity of between 42.5° and 43.0° Bé.; then cooling such solution to crystallize out magnesium chloride hexahydrate and separating the latter from the residual solution.

12. In a method of separating calcium and magnesium chlorides from solutions containing the same which includes separating tachydrite crystals from a mother liquor having a higher proportion of calcium chloride to magnesium chloride than the original solution, the step which consists in dissolving such crystals in a limited amount of water with heating such that a solution is produced from which upon cooling to approximately 30° C. crystals of magnesium chloride hexahydrate will be precipitated and the filtrate remaining from the crystals will have a gravity of between 42.5° and 43° Bé.

13. In a method of separating calcium and magnesium chlorides from solutions containing the same which includes separating tachydrite crystals from a mother liquor having a higher proportion of calcium chloride to magnesium chloride than the original solution, the steps which consist in dissolving such crystals in a limited amount of water with heating such that a solution is produced from which upon cooling to approximately 30° C., crystals of magnesium chloride hexahydrate will be precipitated and the filtrate remaining from the crystals will have a gravity of 42.5° and 43° Bé., cooling such solution to crystallize out magnesium chloride hexahydrate crystals and separating such crystals from the residual solution.

Signed by me, this 10 day of September, 1928.

WILLIAM R. COLLINGS.